United States Patent [19]

Portal et al.

[11] 4,197,181

[45] Apr. 8, 1980

[54] STATIONARY PARTICULATE BED DUAL ELECTRODE

[75] Inventors: Charles Portal, Newton, Mass.; Glenn M. Cook, Naperville, Ill.

[73] Assignee: Kennecott Copper Corporation, New York, N.Y.

[21] Appl. No.: 32,256

[22] Filed: Apr. 23, 1979

Related U.S. Application Data

[63] Continuation-in-part of Ser. No. 953,832, Oct. 23, 1978, abandoned.

[51] Int. Cl.[2] ............................ C25C 7/02; C25C 7/04
[52] U.S. Cl. .................................... 204/283; 204/285; 204/287
[58] Field of Search ................................ 204/283–285, 204/287, 222, 105 R, 106

[56] References Cited

U.S. PATENT DOCUMENTS

| | | | |
|---|---|---|---|
| 1,449,462 | 3/1923 | Van Arsdale | 204/285 X |
| 3,620,955 | 11/1971 | Jones | 204/283 |
| 3,663,298 | 5/1972 | McCoy et al. | 204/283 X |
| 3,682,798 | 8/1972 | Tuddenham et al. | 204/285 X |
| 3,703,452 | 11/1972 | Beroff et al. | 204/285 X |

Primary Examiner—John H. Mack
Assistant Examiner—D. R. Valentine
Attorney, Agent, or Firm—John L. Sniado; Anthony M. Lorusso

[57] ABSTRACT

Disclosed is an easily assembled and disassembled stationary particulate bed dual electrode for recovering metal values from electrolytic solutions. The electrode comprises two assemblies adapted for mating with one another. Each assembly has a perforated flow distributing plate and a basket-like compartment for holding carbonaceous, conductive particles onto which the metal values deposit. This compartment is quickly and easily disassembled for removal of the metal-clad particulate bed.

11 Claims, 6 Drawing Figures

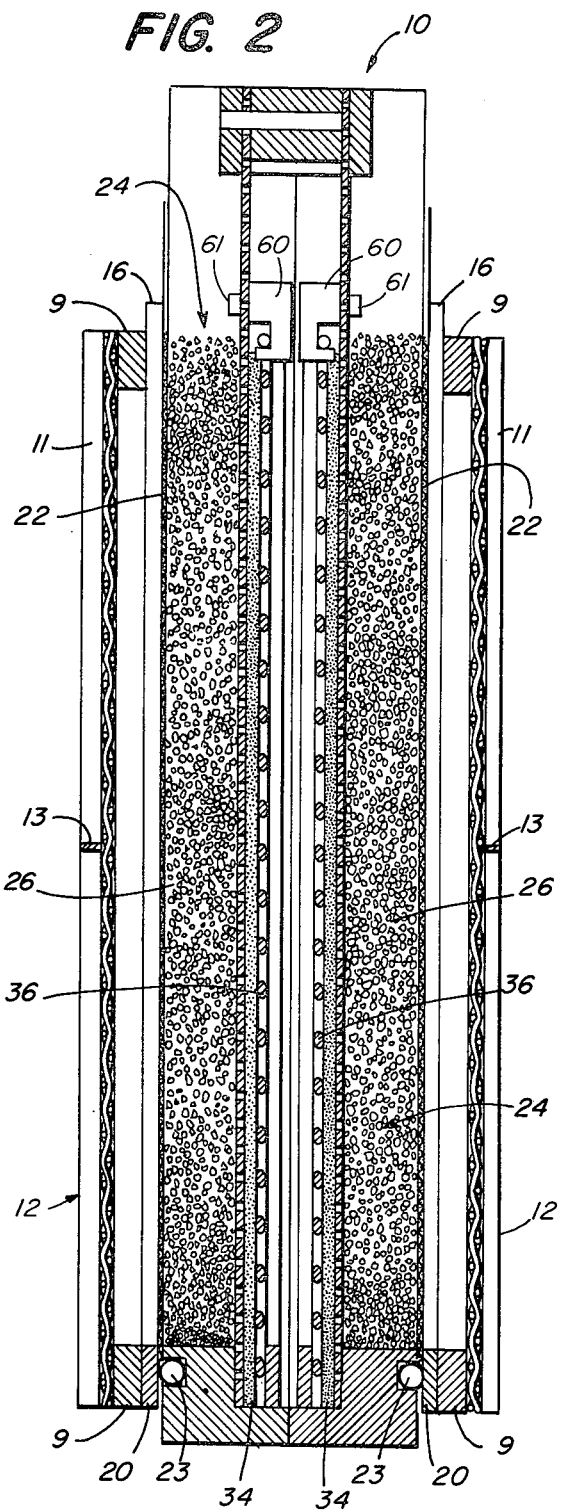
FIG. 2
FIG. 3
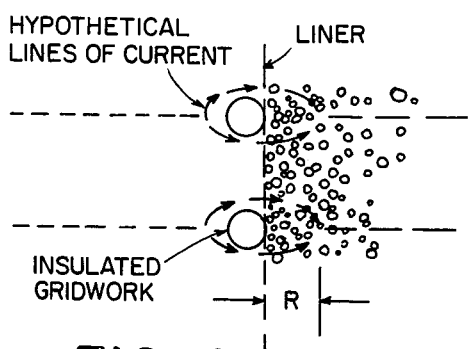
FIG. 4

STATIONARY PARTICULATE BED DUAL ELECTRODE

REFERENCE TO RELATED APPLICATIONS

This application is a continuation in part of copending application Ser. No. 953,832, filed Oct. 23, 1978, now abandoned, entitled Stationary Particulate Bed Dual Electrode.

BACKGROUND OF THE INVENTION

This invention relates to an electrode for use in metal electrowinning and electrorefining processes and more particularly, to a stationary particulate bed dual electrode.

In conventional electrowinning and electrorefining processes for recovering metal values from liquid solutions, the electrodes have assumed the form of flat plates onto which the metals deposit when an electrical potential is maintained between an anode and a cathode submerged in the solution. With flat plate electrodes, however, the solution must be highly electrically conductive and highly concentrated in the metallic ion whose deposition is desired. This is so because the rate of transfer of the ion species frame solution to the surface of the electrode depends both on the conductivity of the solution and the electrode surface area available for the deposition reaction. With flat plate electrodes, the surface area available for the deposition reaction is necessarily limited.

In copper electrowinning using flat plate electrodes, for example, effective operation requires a highly electrically conductive solution containing at least 30 to 45 grams/liter of copper ions. Furthermore, a conventional, flat plate electrode electrowinning process is capable of reducing the concentration of copper from 45 grams/liter in a feed solution, for example, to only about 30 grams/liter in the effluent on a single pass through the electrowinning cell.

Electrowinning electrodes employing porous or particulate conductive media to enhance the surface area for metal deposition are known. The handling of such electrodes in commercial installations can be cumbersome and highly labor intensive because of the large numbers of electrodes involved in a typical tankhouse operation and the measure necessary to keep each electrode functioning properly. For example, a particulate bed electrode first must be loaded with fresh or recycled conductive particules or other porous media. After metal deposition upon the particulate medium has been completed, the electrode must be removed from the electrowinning cell and disassembled so that the particulates containing the metal product can be unloaded and transferred in bulk to the next processing stage.

The unloading of the metal containing particulates is particularly difficult in situations in which metallic dendrites grow beyond the boundaries of the particulate bed and through the supporting interface material, creating thereby a bond between the interface material and the metal-laden particulates. This bonding necessarily makes it difficult and time consuming to unload the metal-particulate aggregate.

Another difficulty can be the distortion of the electric field by the supporting interface material, causing non-uniformity in the rate of metal deposition and even creating blind, or unreactive, areas in the particulate bed through which the metal containing solution may pass unaltered, degrading the metal removing efficiency of the cell.

It is, therefore, one object of this invention to provide a low cost, highly efficient stationary particulate bed dual electrode design capable of recovering metal values from dilute, poorly electrically conductive solutions, with minimum downtime.

Another object of the invention is the development of such an electrode for use in conventional tankhouse facilities which is easily removed, readily disassembled for removal of the metal laden particles and quickly reassembled for refilling with fresh conductive particles.

Yet another object is to provide an electrowinning electrode which eliminates bonding of the metal laden particles with the supporting interface material thereby assuring ease of aggregate removal, and which minimizes unreactive or blind areas through which the metal-containing solution may pass unchanged.

Other objects, features and advantages of the present invention will become apparent in what follows.

SUMMARY OF THE INVENTION

An easily assembled and disassembled stationary particulate bed dual electrode for the direct electrowinning of metal values from solutions according to the present invention employs two stationary particulate bed electrode assemblies adapted for mating to one another in an electrically connected relationship. When mated, the electrode assemblies create an internal cavity for the introduction of metallic ion containing solutions from which metal values are to be extracted.

Each electrode assembly comprises an electrically non-conductive support frame holding a perforated, electrically conductive flat distributor plate through which the solution flows. This plate serves to distribute evenly both the solution flow and the flow of electrical current. Attached to the side of the perforated distributor plate facing the internal cavity is a coarse filter strainer which serves as a fluid distributor and a means for removing large particulate matter from the electrolytic solution before it passes through the distributor plate and into the particulate bed where the deposition reaction occurs. Attached to the frame and spaced apart from the other side of the distributor plate to form a basket-like compartment is a permeable means for supporting a bed of conductive, carbonaceous particles onto which the desired metal values deposit.

The means by which the two electrode assemblies are mated and the means for holding the filter and the particulate bed support are designed so that the dual electrode may be assembled and loaded with the conductive particles quickly and easily, and, after metal deposition, disassembled and unloaded equally easily and quickly.

In a preferred embodiment, the two electrode assemblies are held in the mated configuration by means of quick-release latches. Each latch has a stationary member securely attached to either of the two supporting non-conductive frames and an articulating member attached to the frame of the other electrode assembly. The articulating member is adapted to engage the fixed member and, when latched, to pull the two electrode assemblies tightly together. These latches release quickly with a minimum of effort allowing the two assemblies to be separated. In this embodiment, the filter means for removing particles from the electrolyte solution comprises a strainer or filter element and a retainer screen which holds the filter element against the cavity-facing side of the perforated distributor plate. The retainer screen is attached to the distributor plate by means of two notched blocks, the notches closely surrounding a single edge of the retainer screen. This method of attachment allows the retainer to pivot away from the distributor plate when the electrode assemblies are unmated thereby allowing the underlying filter element to be changed quickly.

The support forming the basket-like compartment which holds the bed of conductive, carbonaceous particles, e.g., coke, comprises a cloth-like interface liner against which the conductive particles rest, and an overlying, rigid, nonconductive support screen to provide mechanical integrity. The means of attachment of both the interface liner and support screen allow them to be removed from the electrode frame easily and quickly. The support screen is held in place by means of open hooks on the screen which engage mounting rods extending from the electrode frame. This screen is removed simply by lifting it off the mounting rods. The interface liner is held in place by means of three dowels or rods attached to three sides of the liner, which fit into three slots in the electrode frame. The dowels are then secured by three easily attached and removed clamp strips overlying the slots. So that metal values do not deposit upon the support screen, it must be electrically insulated from the particulate bed. In this embodiment the screen is made of interwoven metal wires which are then coated with an insulating material. These interwoven, insulated wires preferably have curve diameters or strand thicknesses of less than ⅛ inch. For relatively large diameter particles, the wire diameter should be less than three times the diameter of the conductive particles. With particles smaller than 800 microns in diameter or when fibrous, carbonaceous mats are used, a ⅛ inch strand thickness is preferred. The interface liner of this preferred embodiment comprises thin multifilament filter cloth to discourage the bonding of the particulate bed with the liner. This is accomplished with a cloth having high permeability, a large percentage of open area and a high degreee of uniformity in the open areas.

In another preferred embodiment, the particulate bed support screen is made from thin strips of electrically nonconductive material arranged in a honeycomb configuration. This configuration minimizes blind or unreactive areas within the particulate bed. It is preferred that the honeycomb cell wall thickness be less than ⅛ inch.

It is thus seen that the stationary particulate bed dual electrode disclosed herein is capable of quick and easy assembly and loading with conductive particles and just as easily disassembled for removal of the metal clad particulate bed and change of the internal filter element.

BRIEF DESCRIPTION OF THE DRAWING

The invention disclosed herein may be better understood with reference to the following drawings of which:

FIG. 2 is a side sectional view of the stationary particulate bed dual electrode of FIG. 1;

FIG. 3 is a perspective view of a honeycomb configuration for the particulate bed supporting screen;

FIG. 4 is a schematic diagram demonstrating distortion of lines of electrical current within a particulate bed;

DESCRIPTION OF THE PREFERRED EMBODIMENTS

Figure 1:
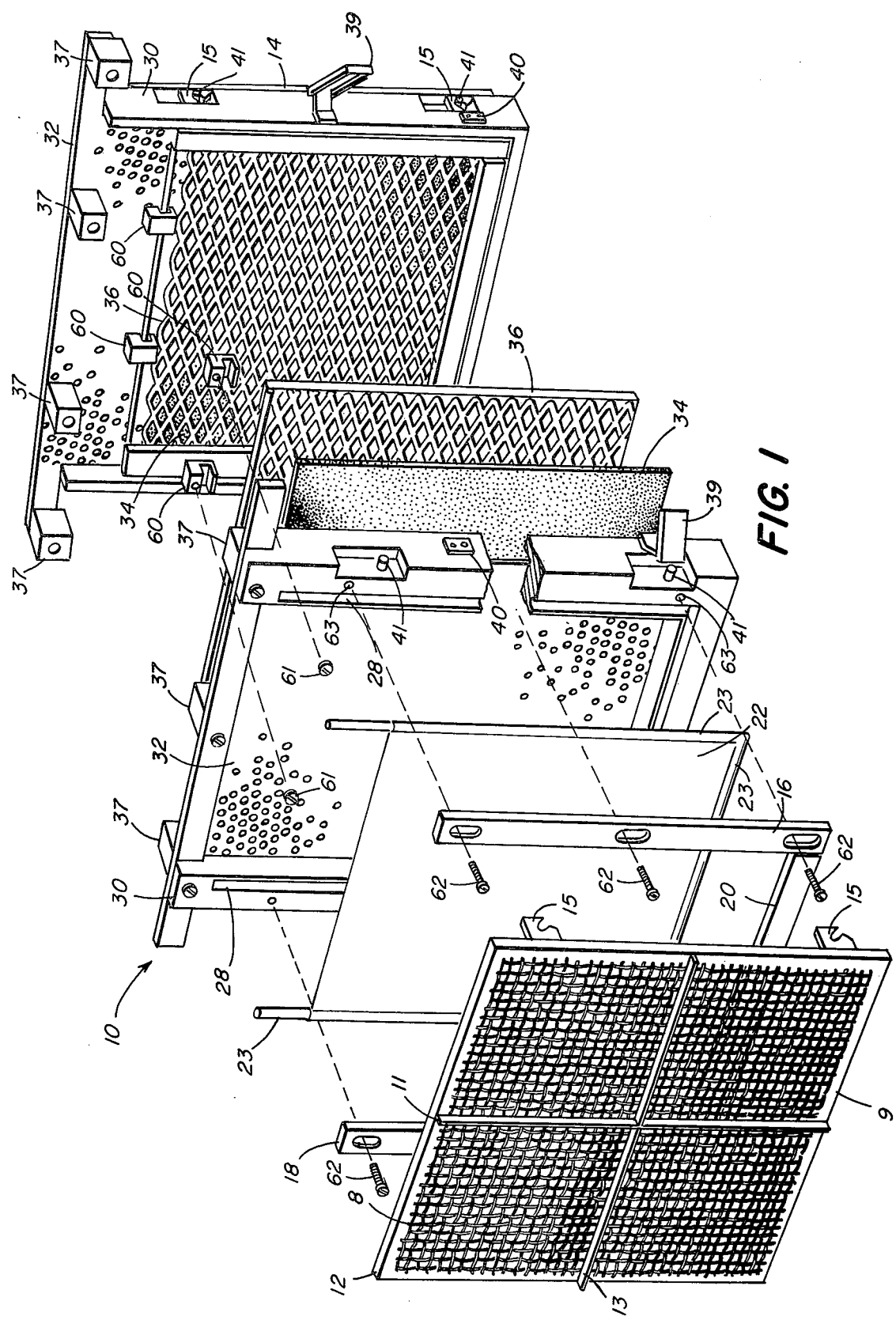
FIG. 1 is a view of a stationary particulate bed dual electrode with one half of the dual electrode shown in an exploded perspective view and the other half shown assembled.

Referring now to FIG. 1, stationary particulate bed dual electrode 10 comprises two electrode assemblies supported by frames 30 which are electrically nonconductive, for example a rigid plastic material. Each frame 30 securely holds a perforated distributor plate 32 made of electrically conductive material, e.g., stainless steel. This plate serves to distribute evenly both the flow of the electrolyte solution and the flow of electrical current through the electrode. Filter element 34 (for flow distribution and elimination of any particulate material in the electrolyte solution before passing through perforated plate 32) is held in contact with plate 32 by retainer screen 36. A suitable filter distributor material is low density polyurethane foam. Retainer screen 36 in turn is attached to plate 32 by means of notched blocks 60, the notches of which surround the top edge of screen 36 thereby permitting it to pivot away from plate 32 so that filter element 34 may be changed when necessary.

Referring to FIGS. 1 and 2, compartment 24 for holding conductive, carbonaceous particles 26, coke in this embodiment, is formed by interface liner 22 which attaches to frame 30. Two sides and bottom of interface liner 22 are formed into loops into which dowels 23 slide. These dowels 23 fit within slots 28 of frame 30 thereby securing liner 22 to frame 30 creating the basket-like compartment 24. The dowels 23 are held within slots 28 by quick release clamp strips 16, 18 and 20. These clamp strips are removed quickly and easily by sliding them parallel to frame 30 and then lifting off screws 62. Thus, interface liner 22 may be quickly removed from frame 30 to remove the metal clad conductive particles from compartment 24 at the end of the deposition reaction.

Interface liner 22 must discourage bonding of the particulate bed to the liner through the action of dendrites growing through the liner material so that the metal-clad particles may be quickly and easily removed. A suitable liner material is a thin multifilament or monofilament filter cloth having high permeability, a large percentage of open area, and most importantly, a high degree of uniformity of the open areas. A preferred interface liner is 115 micron filter cloth with 35% to 40% open area. Most synthetic filter cloths available commercially may be used. Natural fiber cloths, such as cotton must be carefully selected, however. Unbleached muslin, for example, is unacceptable for use with low conductivity electrolytes but acceptable for conductivities exceeding 0.2 ohm$^{-1}$ Cm$^{-1}$.

Figure 5:
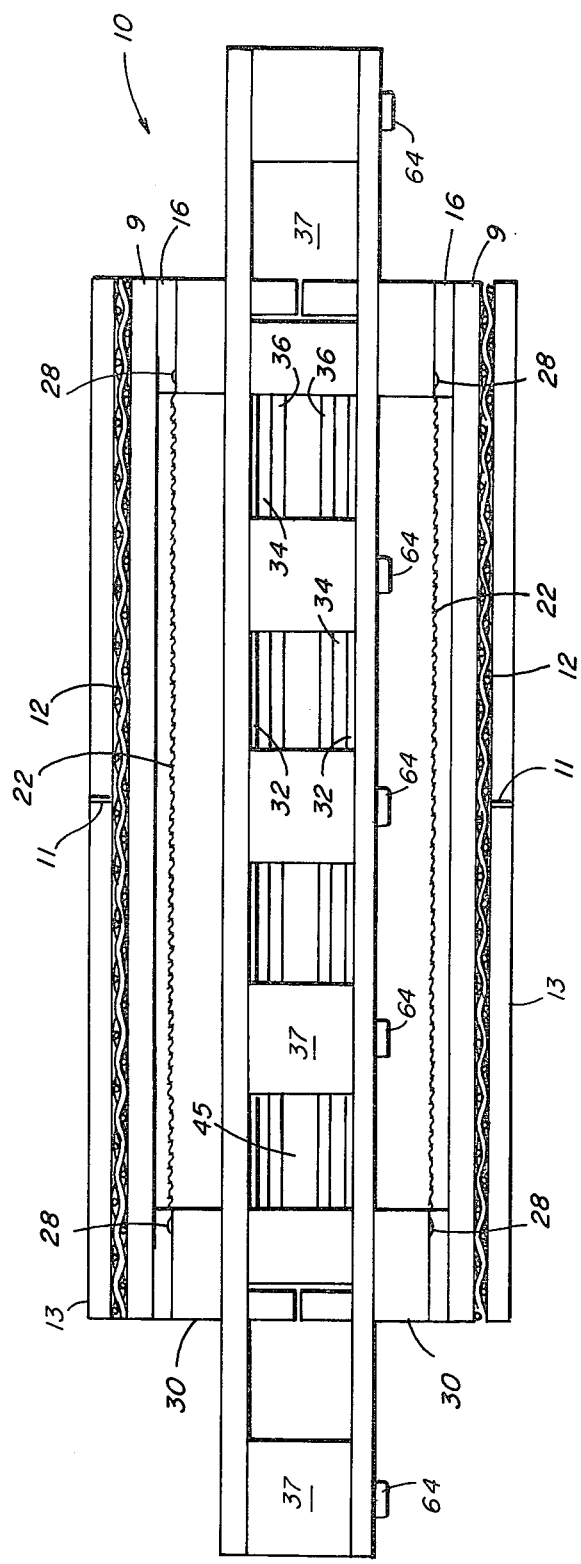
FIG. 5 is a top view of the stationary particulate bed electrode of FIG. 1; and, FIG. 6 is a perspective view of an electrowinning tankhouse facility holding stationary particulate bed electrodes.

Referring now to FIGS. 1, 2 and 5, outer support screen 12 overlies interface liner 22 providing the mechanical support necessary to keep the particulate bed in place especially since it will increase in weight as metal from solution is removed. Screen 12 is made of a rigid frame 9 to which interwoven wires 8 and reinforcing ribs 11 and 13 are attached, thereby forming a rigid structure. Screen 12 attaches to frame 30 by means of open mounting hooks 15 extending from screen 12 which fit over mounting rods 41 on frame 30. Thus screen 12 may be quickly removed by lifting it off mounting rods 41.

Screen 12 must be electrically insulated from the particulate bed for, otherwise, metal values would deposit on it as well as upon the conductive particles 26. In this embodiment, screen 12 is made of metal, e.g., carbon steel or stainless steel, and insulated with a protective coating of epoxy or vinyl ester.

As shown in FIG. 4, the insulated gridwork of screen 12 distorts the lines of electrical current flow within the particulate bed near the interface liner. For electrolytic solutions having very low conductivity, the effective reaction zone, R, is a narrow region near the gridwork. Because of the electrical distortion, those conductive particles lying next to a grid wire are relatively inactive, that is, little metal will deposit on them since little current is flowing in that region. It is therefore important that the grid wires be of small diameter, preferably of diameter equal to or smaller than the diameter of the conductive particles.

In another preferred embodiment, outer screen 12 is made of electrically nonconductive thin strips arranged in a honeycomb configuration as depicted in FIG. 3. Here the thickness of the walls of the honeycomb is smaller than the diameter of particles 36. Such a configuration reduces the number of unreactive particles in the particulate bed, and yet provides the mechanical strength needed to support the particulate bed. A structure such as is shown in FIG. 3 may be made of paper.

Again referring to FIG. 1, the two halves of dual electrode 10 are mated to one another by means of quick release latch elements 39 and 40. Articulating element 39 on one frame 30 engages fixed element 40 on the other frame and pulls the two frames together when latched. The halves are quickly separated when the latches are opened.

Figure 6:
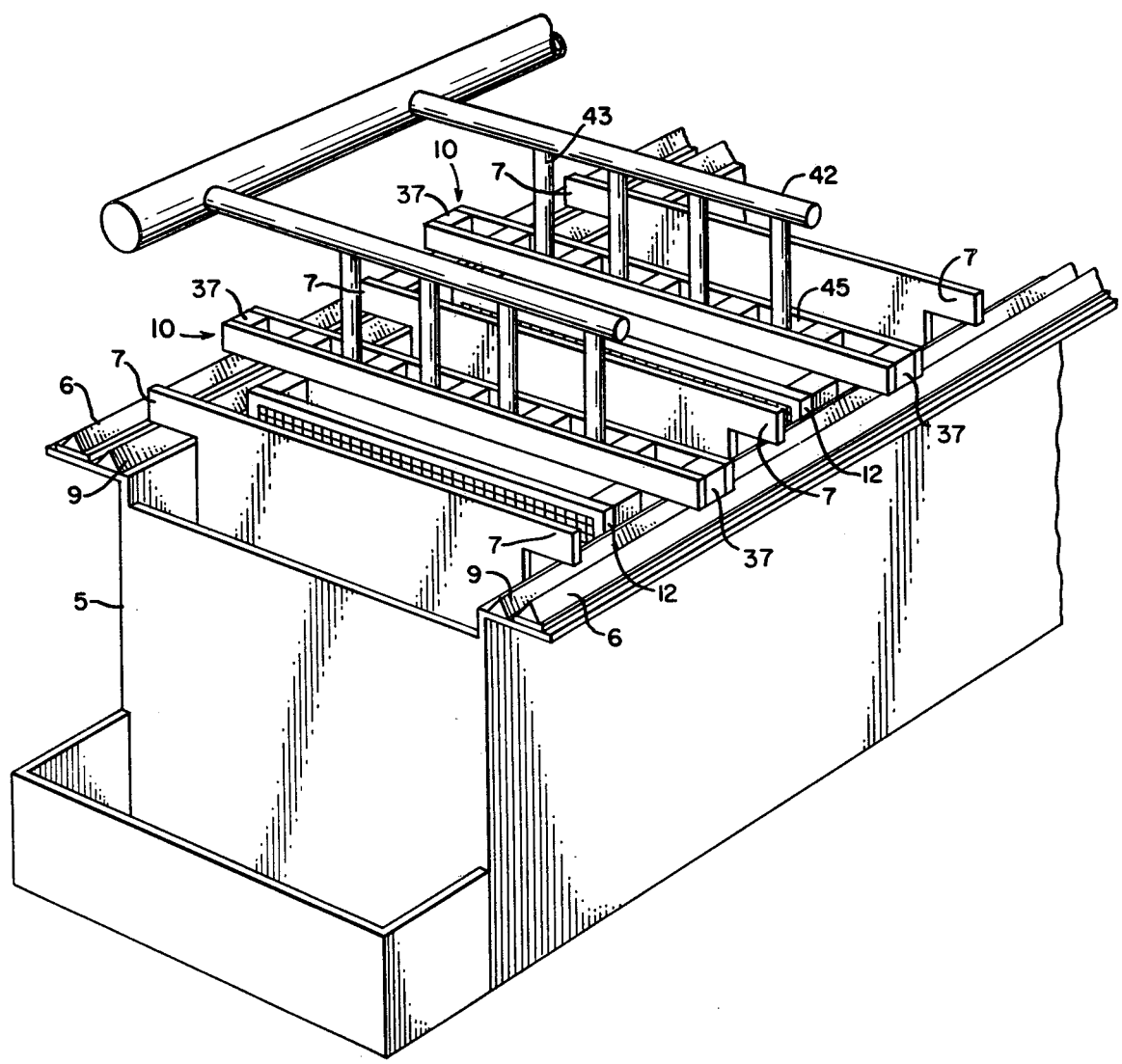

In operation, an electrolytic solution from which metal values are to be recovered is introduced from the top of dual electrode 10 into cavity 45 (FIG. 6) formed by the mating of the two electrode assemblies. The solution is introduced by means of supply manifold 42 feeding discharge ports 43. The dual electrode disclosed herein is designed to be used in a conventional electrowinning cell as shown in FIG. 6. Dual electrode 10, in this case cathodes, rest on negative bus bars 6 of cell 5, and are sandwiched between anodes 7, which rest on positive bus bars 9. Of course the positive and negative bus bars are insulated from each other. In this embodiment contact blocks 37 are each formed from a conductive metal. It is possible to use a single bus bar delivery system by forming one block 37 of an insulator and allowing that block to contact the anodes bus bar. Of course, in this case, the arm of anode 7 that contacts the cathode bus bar would be insulated.

In preparation for electrowinning, the dual electrode is assembled as herein described and the particulate compartments filled with conductive particles such as coke. Fibrous mats of graphite carbon, or carbon felt may be substituted for the carbonaceous particles. The dual electrode is then placed in a conventional tankhouse. When the carbonaceous particles or fibrous mats have received their full complement of metal from the solution, the dual electrode is removed from the tankhouse. As described herein the dual electrode is then quickly and easily disassembled so that the metal clad particulate bed in the form of a solid slab may be removed for further processing.

The stationary particulate bed dual electrode disclosed herein, therefore, is low in cost, highly efficient, and capable of recovering metal values from dilute, poorly electrically conductive solutions. More importantly the dual electrode disclosed may be used in conventional electrowinning tankhouse facilities and is easily and quickly assembled and disassembled.

In view of the foregoing, it may be seen that the objects of the present invention have been achieved and other advantageous results attained.

As various changes could be made in the above preferred embodiments without departing from the scope of the invention, it should be understood that all matter contained in the above description or shown in the accompanying drawings shall be interpreted as illustrative and not in a limiting sense.

What is claimed is:

1. An easily assembled and dissassembled stationary particulate bed dual electrode for the direct electrowinning of metal values from solution comprising:

two stationary particulate bed electrode assemblies adapted for mating to one another in a spaced apart, electrically connected relationship creating a cavity therebetween for the introduction of metallic ion containing solutions, wherein each of said particulate bed electrode assemblies comprises:

an electrically nonconductive support frame;

a perforated, electrically conductive, flat flow distributor plate securely attached to said frame;

filter means adapted for quick attachment to and removal from a first side of said distributor plate facing said cavity, particulate bed support means adapted for attachment to said frame and spaced apart from the second side of said distributor plate creating a basket-like compartment for holding conductive particles onto which said metal values deposit;

first quickly releasing means for holding said two particulate bed electrode assemblies in said mating relationship;

second quickly releasing means for attaching said filter means to said first side of said distributor plate;

and third quickly releasing means for holding said particulate bed support means to said frame;

whereby said dual electrode is quickly assembled and loaded with said conductive particles and quickly disassembled and unloaded of said particles after metal deposition.

2. The stationary particulate bed dual electrode of claim 1 wherein said first quickly releasing means comprises a plurality of latches, each latch comprising a stationary member attached to one of said electrode assembly support frames and a quick release articulating member attached to the other of said electrode assembly support frames, said articulating member adapted to securely engage said fixed member thereby holding said electrode assemblies in said mated relationship.

3. The stationary particulate bed dual electrode of claim 1 wherein said filter means comprises a filter element and a nonconductive or electrically insulated retainer screen holding said filter element against said first side of said distributor plate.

4. The stationary particulate bed dual electrode of claim 3 wherein said second quickly releasing means comprises two notched blocks attached to said first side of said perforated distributor plate, said notches closely surrounding one edge of said retainer screen thereby allowing said retainer screen to pivot away from said perforated distributor plate when said two electrode assemblies are unmated and permitting said filter element to be quickly changed.

5. The stationary particulate bed dual electrode of claim 1 wherein said particulate bed support means comprises a cloth-like interface liner of uniform open spaces and an over lying support screen having curve diameters or strand thickness of less than ⅛".

6. The stationary particulate bed dual electrode of claim 5 wherein said third quickly releasing means comprises
   a. a plurality of open mounting hooks on said support screen adapted to fit releasably over mounting rods extending from said frame thereby holding said support screen; and,
   b. three dowels attached to three sides of said interface liner, said dowels closely fitting within three slots in said frame, and three quickly releasing clamp strips adapted for attachment to said frame to hold releasably said dowels in said slots thereby securely holding said interface liner.

7. The stationary particulate bed dual electrode of claim 5 wherein said interface liner comprises a thin multifilament filter cloth of uniform open spaces to discourage the bonding of said particulate bed to said interface liner, said cloth having high permeability, a large percentage of open area and a high degree of uniformity of said open area.

8. The stationary particulate bed dual electrode of claim 5 wherein said support screen is electrically insulated from said particulate bed and less than ⅛" strand thickness.

9. Stationary particulate bed dual electrode of claim 5 wherein said support screen comprises interwoven wires whose diameters are less than 3 times the diameter of said conductive particles and less than ⅛" strand thickness.

10. The stationary particulate bed dual electrode of claim 5 wherein said support screen comprises a honeycomb configuration of nonelectrically conductive material having cell wall thicknesses of less than ⅛" thick.

11. The stationary particulate bed dual electrode of claim 1 adapted to be an electrical cathode or an anode.

* * * * *